Figure 1:
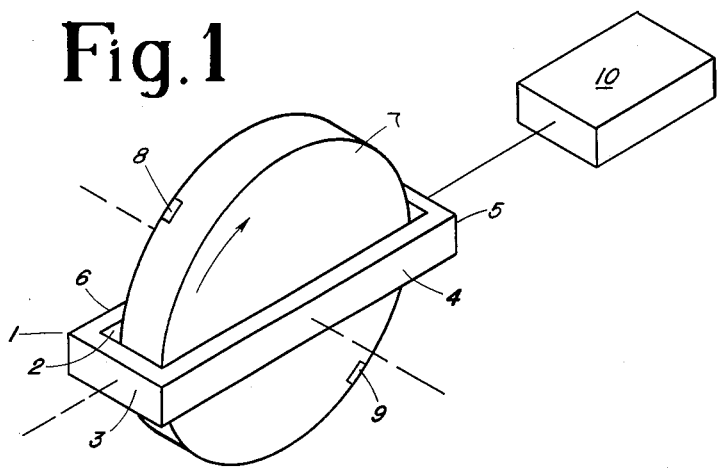

April 18, 1961    R. I. HAUSER ET AL    2,979,957
DYNAMIC BALANCING TECHNIQUE
Filed Oct. 23, 1956

INVENTOR.
RALPH I. HAUSER
EDMUND T. BRIDGE
BY
ATTORNEYS

2,979,957
Patented Apr. 18, 1961

2,979,957

DYNAMIC BALANCING TECHNIQUE

Ralph Irving Hauser, Greenbelt, and Edmund Tyler Bridge, Glen Burnie, Md., assignors, by mesne assignments, to the United States of America as represented by the Secretary of the Navy Filed Oct. 23, 1956, Ser. No. 617,898

5 Claims. (Cl. 73—466)

This invention relates to a dynamic balancing technique.

In the gyroscopic field, an ever existing problem has been the dynamic balancing of gyroscopes for instruments which sense very small magnitudes of precession torques. The usual methods experience difficulty in determining the magnitude and location for correction weights because of the cross-coupling effects. This invention provides a system for the sensitive detection of dynamic couples acting on a rotating member as a result of an unsymmetrical distribution of the rotating mass.

Previously, the gyroscopes were balanced by a device consisting of a cradle mounted at each end by a flexible support. Adjacent to each support was a direction sensitive electro-dynamic pick-off. As the rotor ran at suitable speeds in the cradle, the dynamic unbalance caused the cradle to move upon its flexible supports. Thus, the dynamic balance was determined by the stiffness of the supports, the supported mass and the moment of inertia of the supported mass about its own center of gravity. Under this system, unbalance in one arbitrary plane causes deflection of only one support, while unbalance in another plane causes deflection only at the other support. A voltage sensitive device was then used at each support to record the unbalance.

In practice, the above method had serious disadvantages. It was difficult to design a system to cause unbalance in one correction plane to cause deflection at only one of the supports. Also, adjustment of the system for differently designed gyroscopes required extensive alterations in the cradle or the stiffness of the supports to satisfy the basic dynamic requirements.

The type of gyro which is to be balanced in accordance with this invention makes use of feedback to stabilize the rotating member in the gimbal which normally carries it in the apparatus. Stabilization is about the gimbal axis which is perpendicular to the axis of rotation of the rotating member. The gimbal moves in a sinusoidal manner in response to the dynamic couple to produce an output signal. This signal follows two different paths: (1) it is fed to an amplifier to provide a signal to a torque device for stabilization of the gimbal during its normal operation as a rate gyro and (2) it is used to trigger a pulse-forming network which fires a stroboscopic light to locate the proper places for the balance correction during the rotor balancing operation.

It is an object of this invention to provide for an accurate dynamic balancing system for gyroscopes which incorporate a feedback system and measure the angular rate of the gyro rotor.

It is a further object of this invention to utilize the pulse formed by a dynamically unbalanced gyroscope whereby the magnitude of the pulse is used to indicate the size of the balancing weight required and the phase of the pulse is used to trigger a network and operate a stroboscopic light and locate the proper places for the balance correction.

Other objects and many of the attendant advantages of this invention will be readily appreciated as the same becomes better understood by reference to the following detailed description when considered in connection with the accompanying drawing wherein:

Figure 1 discloses a rotatable member in its gimbal.

Figure 2:
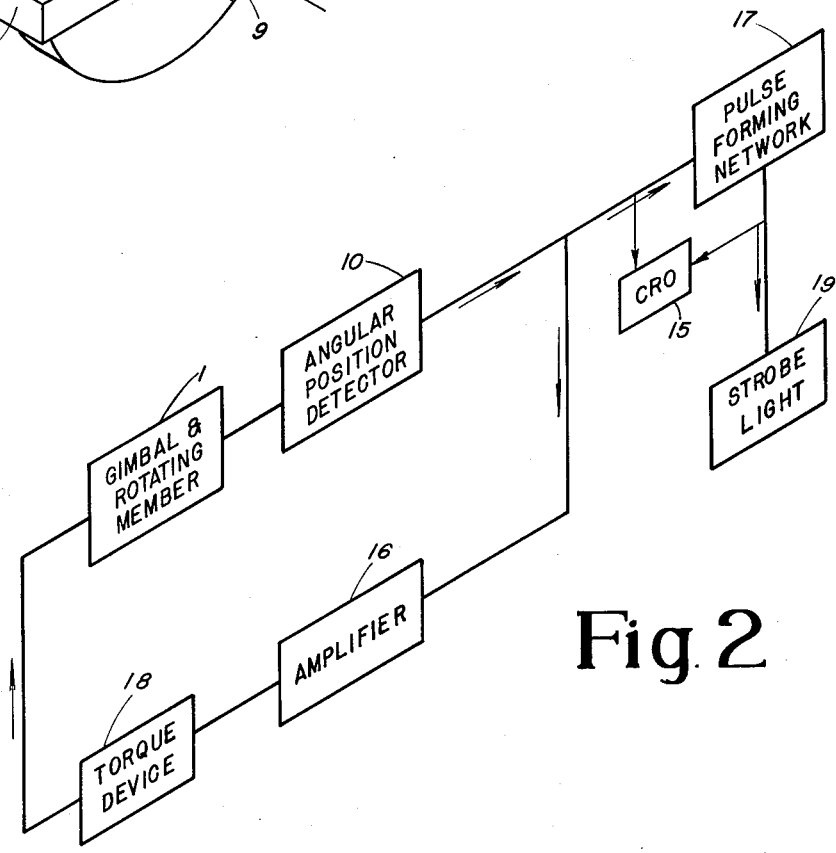

Figure 2 is a block diagram of the dynamic balancing feedback system.

In Figure 1, there is shown a gimbal 1 mounted for rotation or precession about its longitudinal axis. The gimbal 1 consists of a cavity 2 enclosed by side walls 3, 4, 5 and 6. A rotor 7 is rotatably suspended in the cavity 2. Although not shown in detail in the drawing any suitable supporting structure for the gimbal 1 may be used without departing from the spirit or scope of the invention. Thus, for example the gimbal supporting structure may be comprised of a pair of opposed pins or trunnions which project from side walls 3 and 5 of the gimbal and extend along the longitudinal axis thereof. The pins or trunnions could be journalled for rotation in ball bearings or the like which in turn could be carried by a pair of posts or supports positioned at opposite ends of the gimbal.

The mass concentration in the rotor may be considered at points 8 and 9. With rotation of the rotor these mass concentrations cause oscillation of the gimbal 1 which is measured by detector 10. Any suitable conventional sensing device could be used for this measurement such as a device having a magnetic element rigidly fastened to the gimbal which rotates with the gimbal and relative to a stator having two windings. Upon rotation of the gimbal about its axis, the electromagnetic coupling between the windings varies as a function of the gimbal position. By exciting one winding with a suitable A.-C. voltage, a voltage is produced in the second winding that is a function of the gimbal position. This second winding voltage is then used to energize the rate gyro feedback circuit and the multivibrator circuit 17 in a manner that will be more apparent hereinafter.

Thus, in response to a dynamic couple about the gimbal axis the gimbal will move angularly in a sinusoidal manner to produce a motion that is determined by the magnitude of the unbalance. The frequency of motion is regulated by the rotation frequency. The detector 10 produces a signal responsive to the angular position of the gimbal. This signal is used to produce two effects: (1) it energizes an amplifier system for stabilization of the gimbal and (2) it pulses a multivibrator circuit for energization of a stroboscopic light.

In Figure 2, there is illustrated a block diagram of a conventional rate gyro which includes a feedback network. A disturbing torque caused by the dynamic couple about the gimbal axis is introduced into the system in accordance with conventional gyro principles. This torque acts on the gimbal 1 and causes to actuate the gimbal position indicator 10 to send out the signals to the amplifier 16 and the pulse forming network 17. The signal from the amplifier 16 is fed into a torque device 18 which provides a nulling torque output for the stabilization of the gimbal.

Inasmuch as the details of the torque generating device 18 form no part of the present invention, for the sake of simplicity a full description of the same is not provided herein. For a complete understanding of the invention, it need only be stated that the torque device 18 operates in a manner similar to an electric motor or a D'Arsonval type torque generator. Thus, as the gyro is rotated at its designed velocity for measurement of the angular rate of its gimbal, the output signal from amplifier 16 energizes the torque generator which applies a torque to the gimbal substantially equal and opposite to the disturbing torque so as to null displacement of the gimbal axis from its preset attitude. During the balancing operation, however, the gyro rotor is rotated at a greatly increased velocity. At this increased velocity, it has been found that the torque output of torque device 18 is still substantially out of phase with that of the disturbing torque but that its magnitude is so reduced that for all practical purposes the effect of the feedback network can be ignored.

During the gyro balancing operation while the rotor spins at the above said greatly increased velocity, the sinusoidal output signal from detector 10 is fed into the pulse forming network 17 which includes a conventional free running multivibrator. The cathode ray oscilloscope 15 is energized by the output of the multivibrator as well as detector 10. By simultaneously observing the traces of the detector and multivibrator output signals on the oscilloscope, the parameters of the multivibrator are adjusted so that the multivibrator fires each time the sinewave output signal from detector 10 reaches a maximum value.

The square uni-potential multivibrator output pulse is then used to fire a stroboscopic light 19 that is positioned to illuminate the rotating member. Since the maximum value of the sinewave output signal of detector 10 occurs when the rotor experiences a maximum condition of unbalance, the stroboscopic light emits light only at the instance of maximum torque, and the rotor 7 appears stopped in the attitude corresponding to the maximum dynamic unbalance torque. Thus, the pulse serves to locate the proper places for the balance correction the magnitude of which may be determined from the magnitude of the signal to the torque device.

For the successful use of the method, the blocks in the loop must have the following special characteristics:

(1) The phase shift through the torque device must be zero degrees or nearly so at the frequency of rotation of the rotating member.

(2) The closed-loop phase shift at the frequency of rotation must be 180 degrees or nearly so. In other words, a torque disturbance must cause a torque output of the torque device which is out of phase with the disturbing torque.

(3) The system must be stable, i.e., non-oscillatory when no disturbing torque acts on the system.

Obviously many modifications and variations of the present invention are possible in the light of the above teachings. It is therefore to be understood that within the scope of the appended claims the invention may be practiced otherwise than as specifically described.

What is claimed is:

1. A system for determining the location and magnitude of dynamic couples acting on a gyroscope rotor or the like rotatably supported in a gimbal journalled for rotation about a fixed axis of precession comprising detection means associated with said gimbal for producing a signal in response to sinusoidal angular movement of said gimbal about said axis of precession upon the application of a disturbing torque thereto by said dynamic couples acting on said rotor, the amplitude of said sinusoidal movement of said gimbal being determined by the magnitude of said dynamic couples and the frequency thereof being determined by the frequency of rotation of said rotor, a feedback network including means to amplify said signal produced by said detection means, torque means in said feedback network associated with said gimbal for applying a stabilizing torque to said gimbal in opposition to said disturbing torque applied thereto to stabilize said rotor and said gimbal and thereby prevent the sinusoidal angular movement of said gimbal, said amplified signal being fed to said torque means for controlling the operation thereof and having a magnitude proportional to the magnitude of said dynamic couples acting on said rotor, a pulse forming network energized by said signal produced by said detection means and being operable to produce a pulse at the instant when said amplified signal fed to said torque means is a maximum, and a stroboscopic light fired by said pulse and positioned to illuminate said rotor to thereby determine the location of said dynamic couples acting on said rotor.

2. A system as claimed in claim 2 wherein said pulse forming network includes a phase adjustable multivibrator which produces a square uni-potential pulse, said pulse being adjusted in time to occur at the same instant that the amplified signal fed to said torque means is a maximum.

3. A system as claimed in claim 2 wherein the phase shift through said torque means is substantially zero degrees at the frequency of rotation of said rotor.

4. A system as claimed in claim 2 wherein the output of said torque means is out of phase with said disturbing torque.

5. A system as claimed in claim 2 wherein said detection means, said feedback network and said pulse forming network are stable or non-oscillatory in the absence of the application of a disturbing torque to said gimbal.

References Cited in the file of this patent

UNITED STATES PATENTS

| | | |
|---|---|---|
| Re. 23,784 | Weaver et al. | Feb. 16, 1954 |
| 1,535,538 | Maxfield et al. | Apr. 28, 1925 |
| 1,639,444 | Terry | Aug. 16, 1927 |
| 2,361,071 | Vang | Oct. 24, 1944 |
| 2,848,897 | Rambo | Aug. 26, 1958 |

FOREIGN PATENTS

| | | |
|---|---|---|
| 222,195 | Great Britain | Sept. 25, 1924 |
| 546,509 | Great Britain | July 16, 1942 |
| 729,901 | Great Britain | May 11, 1955 |